(12) United States Patent
Morrison et al.

(10) Patent No.: US 7,999,550 B2
(45) Date of Patent: Aug. 16, 2011

(54) MULTI-SENSOR SYSTEM FOR THE DETECTION AND CHARACTERIZATION OF UNEXPLODED ORDNANCE

(75) Inventors: Frank H. Morrison, Berkeley, CA (US); Erika Gasperikova, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 429 days.

(21) Appl. No.: 12/237,668

(22) Filed: Sep. 25, 2008

(65) Prior Publication Data

US 2009/0219027 A1    Sep. 3, 2009

Related U.S. Application Data

(60) Provisional application No. 61/028,800, filed on Feb. 14, 2008, provisional application No. 60/975,911, filed on Sep. 28, 2007.

(51) Int. Cl.
*G01V 3/08* (2006.01)
(52) U.S. Cl. .................. 324/326; 324/329; 324/343
(58) Field of Classification Search .............. None
See application file for complete search history.

(56) References Cited

U.S. PATENT DOCUMENTS 6,437,573 B1 *   8/2002  Golder et al. ........... 324/329
7,466,134 B2 * 12/2008  McCarty ................. 324/327

OTHER PUBLICATIONS

Smith, et al., "Multi-transmitter multi-receiver null coupled systems . . . ," Journal of Applied Geophysics, vol. 61, p. 227-234, (2007).
Smith, et al., "Otpimizing Receiver Configurations for Resolutions of Equivalent Dipole . . . ," IEE Trans. on Geosci & Remote Sensing, vol. 43, No. 7, p. 1490-1498, (Jul. 2005).
Smith, et al., "Estimating Equivalent Dipole Polarizabilities for the Inductive . . . ," IEE Trans. on Geosci & Remote Sensing, vol. 42, No. 6, p. 1208-1214, (Jun. 2004).

* cited by examiner

*Primary Examiner* — Minh N Tang
(74) *Attorney, Agent, or Firm* — Lawrence Edelman; Lawrence Berkeley National Laboratory

(57) ABSTRACT

To fully characterize the inductive response of an isolated conductive object, such as buried unexploded ordinance, one needs to measure its response to stimulation by primary magnetic fields in three linearly independent (e.g., approximately orthogonal) directions. In one embodiment this is achieved by measuring the response to magnetic fields of three independent transmitters arranged to have magnetic fields that are linearly independent. According to the apparatus and methods employing the system of this invention, multiple transmitters and receivers of known relative position and orientation on a single platform are used. In a preferred embodiment, matched sets of receiver pairs connected in gradient mode are positioned adjacent to closely spaced pairs of transmitting coils, such that a minor displacement of one or both of the receiver coil pairs relative to the paired transmitting coils will not affect the detected secondary signals emitted by a buried metallic object.

12 Claims, 6 Drawing Sheets

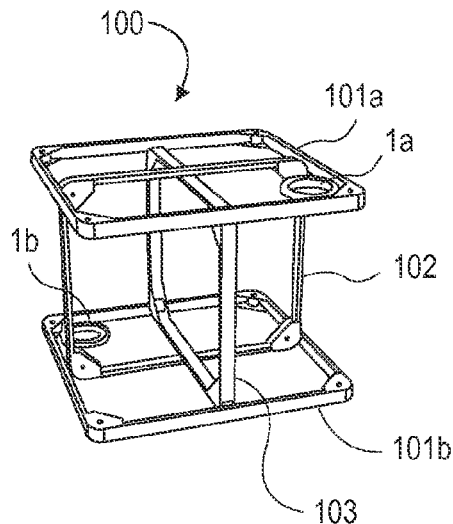
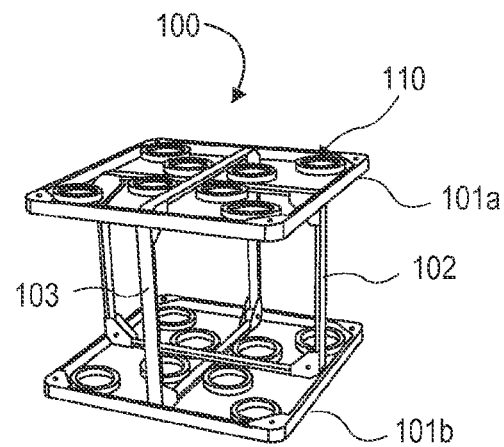
FIG. 1A
(PRIOR ART)
FIG. 1B
(PRIOR ART)
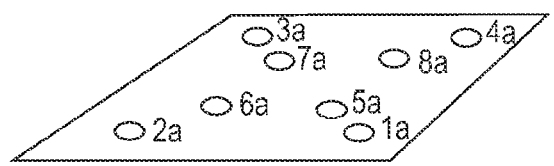
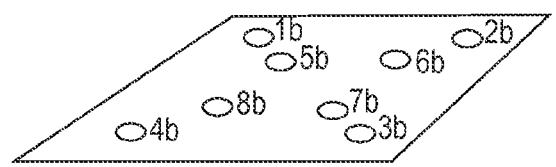
FIG. 1C
(PRIOR ART)

prolate ellipsoid oblate ellipsoid sphere

Inversion results for the principal moments, location and orientation of 9 inch steel spheroid Inversion results for the principal moments, location and orientation of 19x8 cm scrap metal

MULTI-SENSOR SYSTEM FOR THE DETECTION AND CHARACTERIZATION OF UNEXPLODED ORDNANCE

CROSS-REFERENCE TO RELATED APPLICATIONS

This application claims priority to U.S. Provisional Patent Application 61/028,800, filed Feb. 14, 2008, which in turn claims priority to U.S. Provisional Patent Application 60/975,911, filed Sep. 28, 2007, which applications are hereby incorporated by reference in their entireties.

STATEMENT OF GOVERNMENTAL SUPPORT

The invention described and claimed herein was made in part utilizing funds supplied by the U.S. Department of Energy under Contract No. DE-AC03-76SF00098, and more recently tnder DE-AC02-05CH11231. The government has certain rights in this invention.

BACKGROUND OF THE INVENTION

1. Field of the Invention

This invention relates generally to the detection of buried metallic objects, and more specifically to a novel apparatus to be used for the more accurate determination of the depth, size, and shape of buried metallic objects indicative of unexploded ordnance.

In land areas where ordnance has been used, such as artillery ranges, abandoned battle fields and the like, the reclamation of such lands for public or private use is problematic given the oftentimes presence of buried, unexploded ordnance, which ordnance can be triggered in the course of land grading, excavation and the like to thus present unacceptable explosion hazards to those in the field. Presently, metal detectors alone provide less than an ideal means for detection of such ordnance as with the current state of the art detectors have difficulty distinguishing between exploded ordnance which presents itself as scraps or fragments of metal, and unexploded ordnance which presents itself as a projectile in its original form such as of an ellipsoid shape.

2. Description of the Related Art

In our earlier filed provisional application Ser. No. 60/975,911 and our earlier provisional application Ser. No. 60/740,576 filed Nov. 28, 2005, we described apparatus for the detection of UXOs (unexploded ordnance) combining several orthogonally arranged transmission coils with a plurality of receiving coils disposed symmetrically within the coil space, as illustrated in the figures of those applications, and a related article entitled *Multi-transmitter Multi-receiver Null Coupled Systems for Inductive Detection and Characterization of Metallic Objects*, Smith et. al., Journaled of Applied Geophysics 61 (2007) 227-234 [Published Nov. 9, 2007], which paper is incorporated herein by reference in its entirety. Described in both provisionals and the earlier published article was an apparatus wherein a number of transmitting coils were orthogonally disposed one to the other as shown in FIG. 1 herein, the transmitting coils including paired horizontal coils 101a and 101b, and crossed vertical coils 102 and 103. The apparatus further included a plurality of circular receiving coils, these receiving coils 110 incorporated into the frame supporting the transmitting coils, and disposed in symmetric pairs as illustrated in FIG. 1A (for an exemplary single symmetric pair of receiving coils 1a and 1b), and FIG. 1C (for an exemplary array of eight symmetric pairs of receiving coils).

The described system was developed for determining the depth, size, and shape of buried metallic objects. The primary purpose of that system was to discriminate between intact, unexploded ordnance (UXO) and harmless metallic scrap. The system could also be used to locate buried metallic pipes or cables, as well as archeological objects or any metallic object of interest. The system of those prior provisionals afforded greatly enhanced detection capabilities compared to that obtainable by prior art methods through the novel configuration of the sensors of that system.

The operation of that system (and the one of this invention, as well) is based on the well known principles of electromagnetic (em) detection of metallic objects, usually referred to as metal locators or treasure finders. In all of these systems a source of changing magnetic field is provided. This is usually a loop of wire carrying a changing electric current. This source, usually called the transmitter, produces the changing magnetic field which pervades the volume of space near the transmitter. This is usually referred to as the primary field. The changing magnetic field produces an electromotive force, through Faraday's Law, in any nearby electrically conducting object. This in turn causes electric current to flow in the object. These induced currents in turn produce their own magnetic fields in their vicinity, called secondary fields. The detection of these secondary fields provides evidence of the presence of the metallic object.

The basic design challenge for these system is to provide a means to measure the secondary fields and relate them quantitatively to the location and parameters (size, shape and metal content) of the object (hereinafter called the target). The sensor used to measure the secondary field is usually called the receiver.

Almost all such systems use a single loop of wire for the transmitter and a second loop as the receiver. A magnetic field passing through a multi-turn coil of wires produces a voltage across the terminals of the coils which voltage is proportional to the time rate of change of the magnetic field. (This is the same voltage previously referred to as the electromotive force in Faraday's Law). Such a coil can be calibrated in a known field and this provides the required receiver for the secondary fields produced by the target.

A further theoretical and technical refinement is that the shape of the target may be deduced from knowledge of the currents induced in a target for different orientations of the transmitted field (also called the inducing field). To a high degree of approximation the induced currents in a metallic object can be represented by equivalent small loops of current. In general, any metallic object can be represented by three orthogonal current loops that are excited by incident fields aligned with the axes of these loops.

The equivalent strength of these principal current loops producing the secondary fields are called the principal moments of the target. These moments divided by the inducing field at the position of the induced current loop are called the polarizabilities of the target. It is important to note that these polarizabilities are a property of the target and thus serve to characterize it.

FIG. 4 illustrates how these polarizabilities characterize different shapes. In these examples, the principal polarizabilities are described by arrows (vectors) drawn perpendicular to the equivalent current loops in the body whose lengths are proportional to the strength of the induced moments. Smith and Morrison, *Estimating Equivalent Dipole Polarizabilites for the Inductive Response of Isolated Conductive Bodies*, (2004), IEEE Trans. Geosci. Remote Sens. 42 (6), 1208-1214, and Smith et al, *Optimizing Receiver Configurations for Resolution of Equivalent Dipole Polarizabilities in Situ*.

(2005), IEEE Trans. Geosci. Remote Sens. 43 (7), 1490-1498 (both references incorporated herein by reference), have described the means of estimating the principal polarizabilities of a target using a system having three orthogonal transmitters and a multiplicity of receivers. In short, it was found that a configuration using three orthogonal transmitter loops and eight receiver pairs as shown in FIG. 1 to be sufficient to recover the position of the target and its three principal polarizabilities.

A design challenge for a practical system is to find a means to accurately measure the small secondary fields from the target in the presence of the much larger inducing field from the transmitters. This is called the dynamic range problem. One popular method of doing this is to run the transmitter in the so called transient or time domain. Briefly this means setting up the primary field with a steady current in the transmitter, and then abruptly shutting it off. The rapidly changing magnetic field produces the desired induced currents in the target and these induced currents slowly decay. The decaying secondary fields are thus measured by the receivers in the absence of the much larger primary fields.

Fundamentally any receiver is limited electronically in the range of voltage it can accommodate. During the shut-off of the transmitter, the induced voltage in the receiver coil may be several hundred volts while the induced voltage from the target secondary fields may be measured in fractions of a micro-volt. In a practical system the ratio of voltages measured over the complete range of the primary field would be an impossible 109 or higher. In principle, measuring in the off-time, when the high voltages associated with shut-off have dissipated, allows the full sensitivity and range of the receiver to be utilized to measure the desired secondary fields.

One suggested approach to get around this problem was to use receivers positioned in space a distance from a transmitter so as to not have any generated primary field from the transmitter pass through them. In other words, the receivers were placed such that there was no component of primary field from the transmitter along the axis of the receiver coil. This is referred to as a null-coupled configuration. This approach has also been used in some traditional metal locators which use a continuous sinusoidal current in the transmitter (so called frequency domain systems). The practical problem is that it is mechanically difficult to position the receiver in a true null position. The minutest deformation of the support structure by thermal expansion or vibration introduces large amounts of primary field and compromises the desired sensitivity of the receiver.

Unfortunately these transient systems are not completely immune from the dynamic range problem. While in principle the receiver should only see the secondary fields in the off-time of the transmitter, the fact is that the physical device comprising the receiver, the coil and its amplifiers are still subject to the primary transient and thus experience huge voltages just before they are expected to function at full null signal sensitivity.

In practice it was found (as disclosed in Provisional Application 60/975,911) that a combination of transient measurements employing null coupled receivers of a specialized arrangement can greatly overcome this problem. The system of that prior provisional had three orthogonal loop transmitters as shown in FIG. 1, and eight pairs of receivers (called the vertical moment transmitter) deployed in a symmetric pattern in the planes of the upper and lower horizontal transmitter loops. Any two receivers so located in these two planes whose centers lie on a diagonal passing through the geometric center of the volume defined by the two horizontal coils (101a and 101b) and the two vertical coils (102 and 103) see exactly the same primary field when any of the three transmitters are activated [Smith et al (2007), supra]. When these paired receivers are connected in series opposition to an amplifier, the amplifier sees no signal during the primary transient and has no problem with dynamic range in measuring secondary fields which are not symmetric with respect to the receiver pair—as for example the fields from the target. With this configuration, the location and orientation of the three principal polarizabilities of a target can be recovered from a single position of the transmitter-receiver system.

In one embodiment of that system, the transmitting and receiving coils were mounted to a rollable cart. The system itself included a current source, the transmitter array, a data acquisition module and a processing display module, all of which were mounted to the same rollable cart. In one embodiment the current source was derived from DC batteries carried on the cart. The transmitting coils 101a, b, 102 and 103 were carried by and contained within their respective non-conductive frame elements (see FIG. 1), the number of turns the same for each coil. In one embodiment approximately 30 turns of #10 AWG aluminum wire were use in forming the coils. In operation each coil was pulsed in sequence so that the transients from each transmitter were recorded independently.

As depicted in FIG. 1, the system array is provided in the form of a cube. The size of the cube is not critical, but it should not be so large as to cause loss of portability. In one embodiment, the length of each square side was conveniently selected at 1 meter. With the windings carried within their non-conductive frames, each transmitting coil is electrically isolated from the other transmitting coils. The receiver coils are likewise formed from multi-turns of wound wires which are electrically shielded and supported from above, in the case of horizontal coil 101a and from below in the case of coil 101b. In an embodiment, all of the coil components were electrostatically shielded one from the other, the frame of the system array formed from such non conductive materials as plastic, wood or aluminum.

The diagonally mirrored pairs of receiving coils of the earlier described system are wired together such that there their voltages sum to zero during the on-time phase for the transmitting coils. In the off-time, the secondary fields from the target are not the same at each of the receivers and the difference is directly proportional to the strength of the detected secondary field generated by a buried object, the summed output sent to the data acquisition and display components where the resulting voltage is amplified, processed by computer and the results displayed. In a typical interrogation, each transmitting coil can be sequentially cycled on, then off, with one set of readings recorded for each transmitter coil duty cycle, the two horizontal coils activated together. This produces 24 readings, representing the summed voltages associated with each of the 8 pairs of receivers, 8 readings for each of the three transmitter duty cycles.

Experience has shown that even this system suffers from the problem of inexact null coupling due to mechanical deformation of the structure, both in the manufacturing step, and in the deployment of the unit in the field, where the coil supporting structures themselves may deform as the unit is moved over the terrain to be interrogated. Further, the receiver coils are so close to the transmitter windings that significant leakage of the primary field onto the receiver circuit during the shut-off transient may occur and cause over range distortions of the recovered secondary transient wave form. Thus, there remains a need for an apparatus for reliably detecting buried metal objects including the location and shape of the objects, which method and apparatus does not suffer from the above drawbacks.

SUMMARY OF THE INVENTION

This invention is directed to improvements to the UXO detection devices as described in our earlier provisional applications, the receiver and transmitter elements arranged in a novel configuration which greatly reduces the sensitivity of the receiver elements to mis-positioning. The arrangement of the transmitter coils also provides a more stable platform which reduces deformation of the device as it is rolled over the terrain to be interrogated. The principals of operation are similar to those applicable to the earlier systems, the principal difference being the use of three pairs of orthogonally disposed transmitting coils, and the placement of the symmetric receiving coil pair sets relative to the transmitting coils.

BRIEF DESCRIPTION OF THE DRAWINGS

The foregoing aspects and others will be readily appreciated by the skilled artisan from the following description of illustrative embodiments when read in conjunction with the accompanying drawings.

FIGS. 1A-1C are schematic drawings showing the arrangement of transmitting and receiving coils of our earlier development.

DETAILED DESCRIPTION OF THE INVENTION

Figure 2:
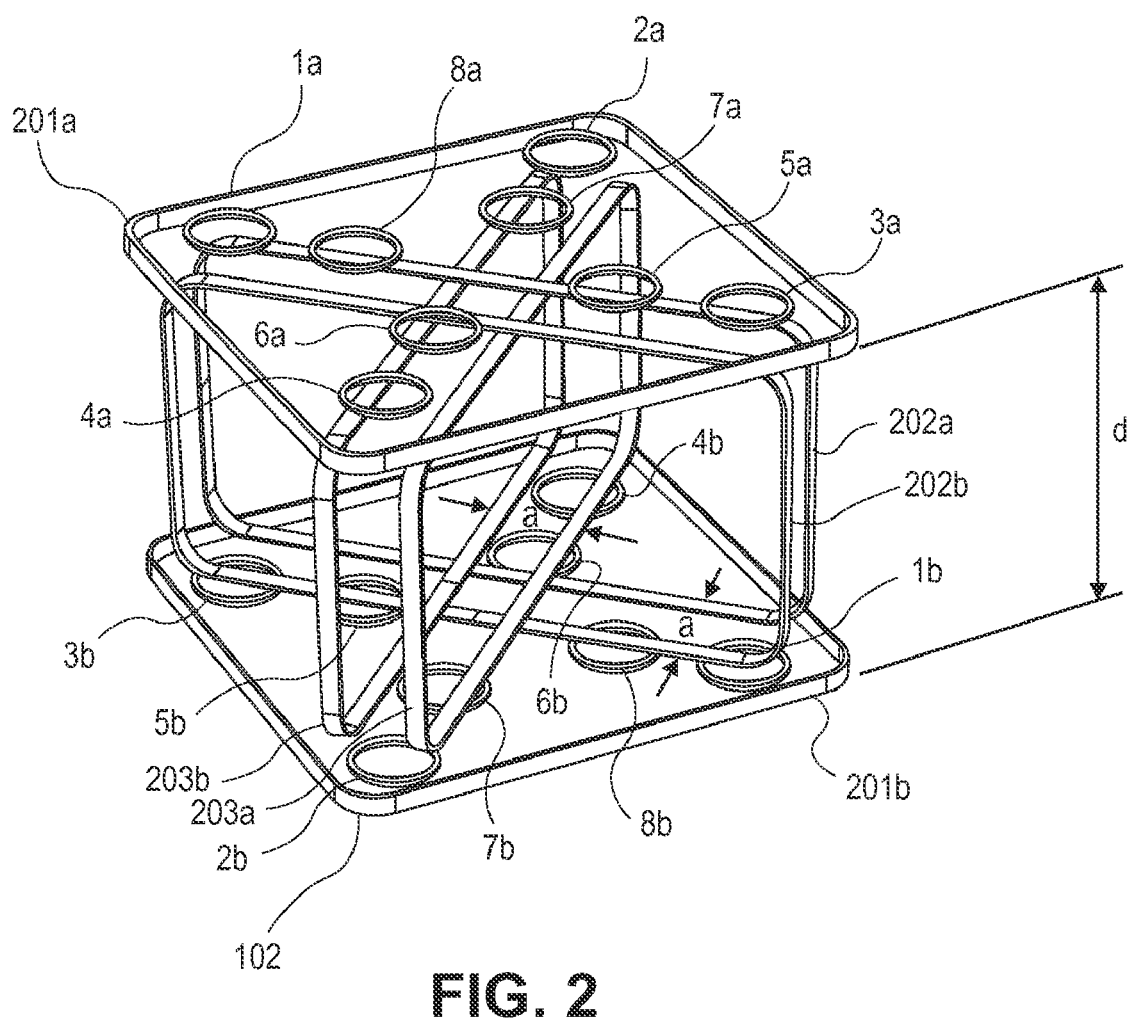
FIG. 2 is a schematic diagram depicting the improved coil arrangement of this invention, including paired vertical transmitting coils.

The new coil arrangement according to an embodiment of the invention is illustrated in FIG. 2, the two single vertical transmitter coils 102 and 103 of the prior art, FIG. 1, replaced by two pairs of coils (202 a-202b, and 203a-203b), the individual coils of each pair separated by a distance "a". The first receiver of each of the 8 receiver coil pairs (coils 1a-8a) is positioned directly over-top, that is laterally centered, relative to transmitter coil pairs 202 and 203. For ease of illustration, the frames which house the coil windings are shown, the frames in fact labeled 201a,b, 202a,b and 203 a,b, the windings themselves nestled inside the frames, which frames provide the structural skeleton for the system. As with the coils described in our earlier provisional applications the frame itself may be formed from such non-conductive materials as wood, plastic, or aluminum.

Figures 3A, 3B:
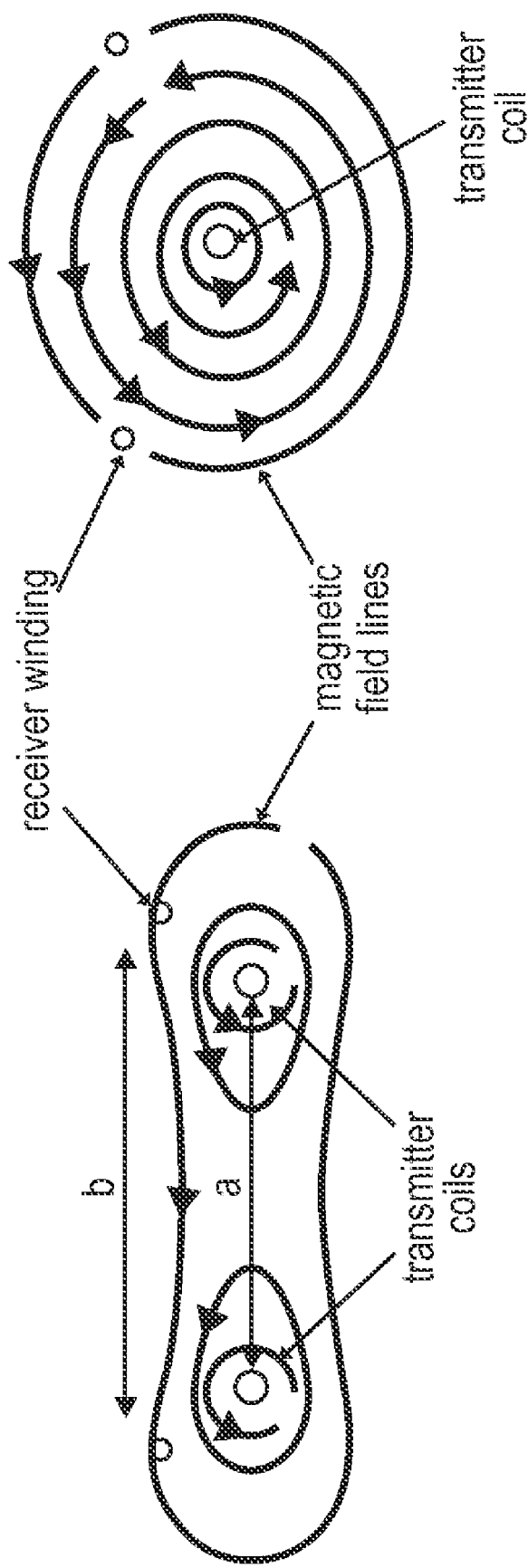
FIG. 3A is a schematic diagram of the coil arrangement of this invention, enlarged to illustrate the positioning of the receiving coils relative to the transmitting coils of FIG. 2.
FIG. 3B is a comparison illustration depicting the condition where only a single vertical coil is employed.
Figure 4:
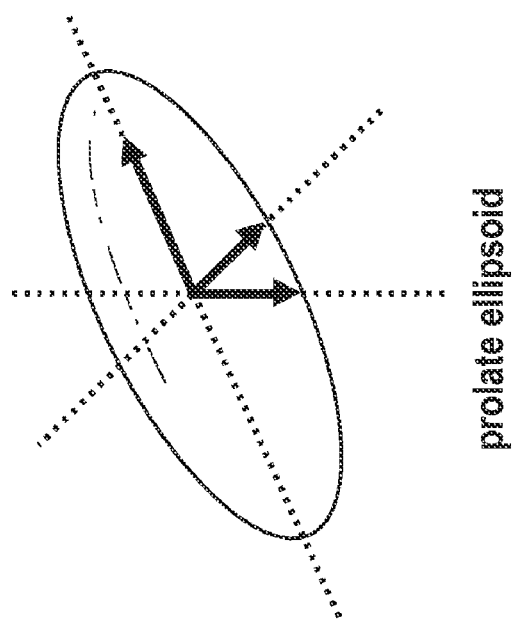
FIG. 4 is an illustration of the types of object shapes which may be detected by the apparatus of this invention, such shapes indicative of unexploded ordnance.
Figure 4:
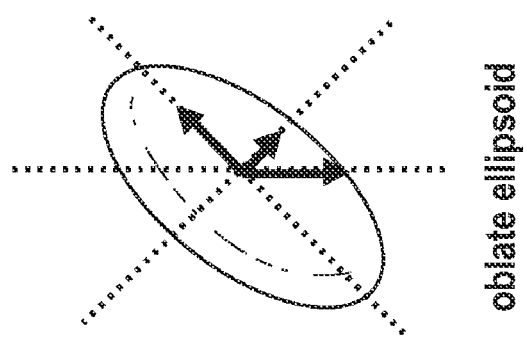
Figure 4:
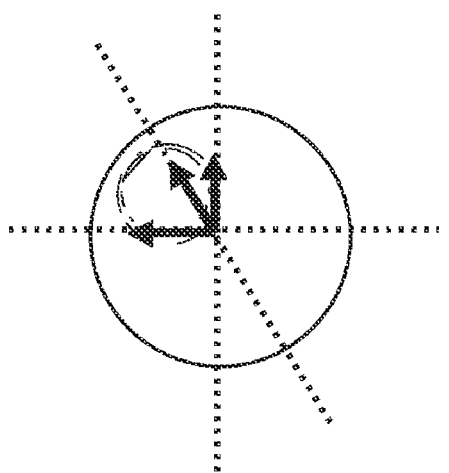

FIG. 3A is a representational illustration in cross section of the flux field for one of the receiver coils positioned above one of the dual transmitter coil sets. By way of contrast, FIG. 3B representationally depicts the flux field for an identical receiver coil above but a single coil winding. When the diameter of the receiver coil "b" is on the order of the transmitter coil separation "a", the primary field is approximately parallel to the plane of the receiver coil and is approximately null-coupled to the transmitter. More importantly, it can be seen that the receiver coil can be shifted slightly in the horizontal plane and yet remain null coupled. However even a slight departure from the null coupled position of the receiver centered over a single transmitter winding, as shown in FIG. 3B, can cause a large change in the net magnetic field flux passing vertically through the receivers. Thus the sensitivity to small perturbations in position of the receiver coil is greatly reduced in the arrangement of FIG. 3A. In one embodiment the receiver coils can be of a diameter equal to the distance between the spaced transmitter coils a. In another embodiment the diameter of the receiver coils can be of a diameter larger than distance a, such that they extend beyond the edge of the paired transmitter coils.

In general the positioning error of the null coupled configuration decreases for any transmitter-receiver configuration as the separation distance of the receiver coil to the transmitter coil increases. In the original configuration of FIG. 1, all the receiver coils are sensitive to mis-positioning, those closest to the transmitter windings the most susceptible. In FIG. 2, the four receiver coils over the active coil are immune from minute mis-positioning. Even in this configuration, however, the two receivers over the inactive coil nearest the active coil can still suffer from minute mispositioning caused by distortions of the frame, the paired receives furthest away from the active transmitter also suffering, but to a much lesser degree, from mis-positioning.

The determination of the polarizabilities of the target depends on the combination of the measurement from the eight pairs of receivers from each of the three transmitters activated independently. The errors in polarizabilty depend upon the errors in the 24 different transmitter-receiver pair measurements. For each of the three transmitter activations, readings of the 8 paired sets of receiving coils are taken. By essentially eliminating the position-caused errors in 4 out of 8 of the measurements for each of the vertical coils 202 and 203, the overall performance of the system is significantly improved.

It is to be appreciated that coil pairs 202a and 202b may be positioned similarly to the single transmitters 102 and 103 of FIG. 1, with the transmitter pairs intersecting the horizontal coils at their mid point. However, by rotating the crossed coil pairs 202a, 202b and 203a, 203b by 45 degrees, as shown in FIG. 2, such that they bisect the corners of horizontally disposed transmitter coils 201a and 201b (in one embodiment having a generally rectangular configuration, in another embodiment (not shown) having a square configuration), both the size and rigidity of the system can be effected. Thus, by positioning the orthogonally crossed vertical coils so they intersect the "system box" at its four corners, a more rigid structure is formed. Secondly, by lengthening the vertical coils in the one direction, while maintaining the same height, their cross sectional area is increased, which in turn increases the primary field generated by each of the vertical transmitters. In another embodiment, if one wished to reduce the overall height of the system, the length of the coils in the vertical direction may be shortened while maintaining the same overall area of the coil.

In the configuration of this invention, the 8 receiving coils atop the system can be mounted on panels, which panels are in turn secured to the ends of the box formed by the frame which contains top transmitter coil 201a, to thus further structurally stabilize the system. In one embodiment the receiver coils are wound onto mandrels that can be integrated into the supporting panels, the panels themselves made of non conducting material such as plastic, and further including electrostatic shielding. In one embodiment, each of the receiving coils is electrostatically isolated one from the other. In another embodiment, using additional shielding, the receiving coils can be further isolated from the transmitting coils, themselves contained within a non-conductive frame. The 8 receiving coils positioned below the bottom transmitter coil 201b can be similarly mounted as those above.

The placement and electrical connection of the paired receiver coils is important to the achieving the null paired condition. As in our earlier Provisional Applications, each complementary pair of coils is arranged on a diagonal which passes through the center point of the assembly, with one of the paired receiving coils positioned above and the other below the horizontally paired transmitter coils, much in the manner as illustrated in FIG. 1 (i.e. gradient mode). What is different with the new system arrangement, however, is that by using paired vertical coils which produce flatter magnetic fields which are parallel to the windings of the receiver coils located above, positioning errors of the receiver coils are more easily tolerated without degrading the null setting of the coils. Ideally, the receiving coils are positioned symmetrically, centered overtop a coil pair. In the configuration of this improvement, however, absolute accuracy in positioning is not required. Additionally during field use, the system itself, being more rigid, is less likely to deform and the resulting movement of the receiver coil elements less likely to affect the measured results.

Figure 5:
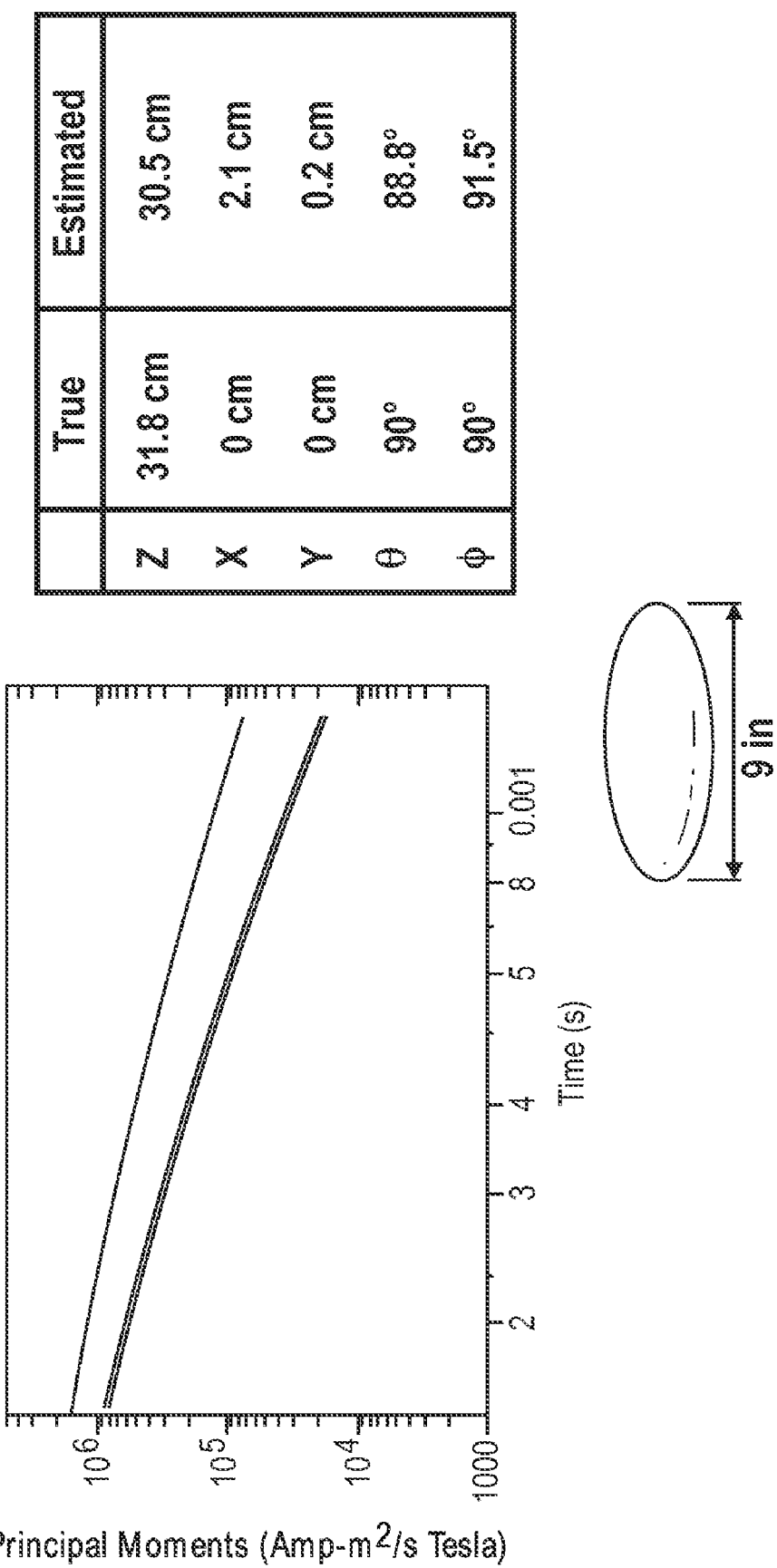
FIG. 5 is a plot exemplary of the type of data generated for a steel spheroid using a multiple transmitting and null paired receiving coil arrangement.
Figure 6:
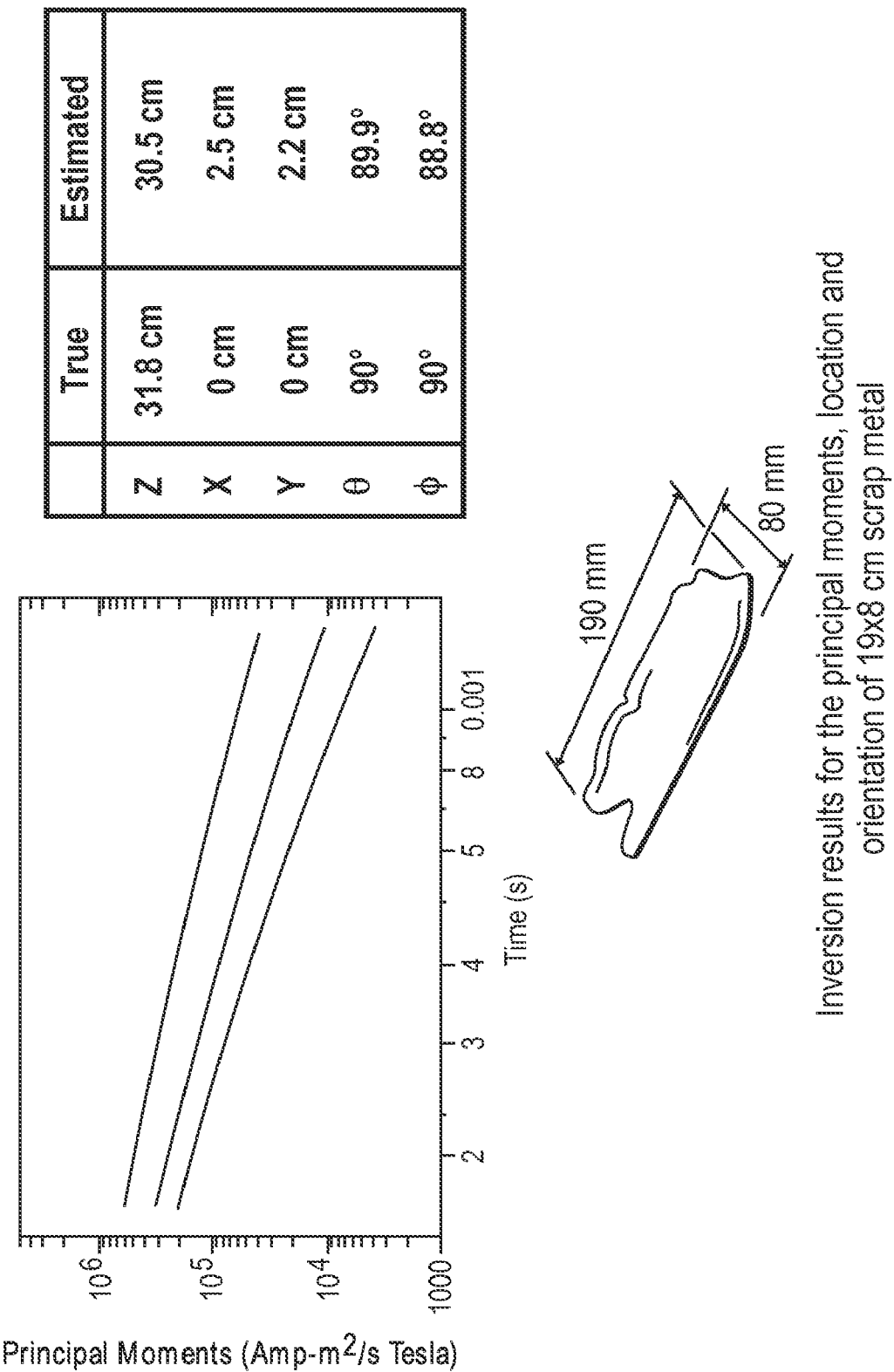
FIG. 6 is an plot exemplary of the type of data generated for a piece of scrap metal using the same multiple transmitting and null paired receiving coil arrangement used to develop the data of FIG. 5.

In the field, the cart mounted assembly of the improved assembly can be rolled along the ground, looking for a threshold signal, indicating the presence of a buried metal object. Since, with buried unexploded ordnance an igniter is required, there is little likelihood that being close to or even directly above such ordnance would cause it to explode. Thus, when the presence of a buried metal object is indicated, the cart is brought to rest and a data set collected with the system in stationary mode. As with the earlier described systems, the transmitter coils are energized, then turned off, one at a time, with readings taken of the net output of the null paired receivers during transmitter coil off-time, eight readings taken for each of the three coil pairs. The transmitter on-off sequence may be performed one or more times, as desired. Algorithms developed for the system, which do not form a part of the instant invention, are used to interpret the recorded data, and then display on, for example, a computer monitor. A typical display for a buried metal spheroid and buried piece of scrap metal are as shown in FIGS. 5 and 6.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A system for the detection and characterization of buried metal objects, wherein the system employs three orthogonally disposed transmitting coils, and multiple pairs of receiving coils, the improvement comprising a system having:
   a pair of horizontal transmitting coils vertically spaced in parallel planes a given distance one from the other;
   two sets of vertically disposed transmitting coil pairs, said coil pairs positioned between, and perpendicular to the planes of the horizontally disposed coils; and further positioned orthogonally one relative to the another; and
   multiple paired sets of receiving coils arranged in gradient mode, wherein each of said receiving coils is positioned in a spaced relationship adjacent a vertically disposed transmitting coil pair.

2. The system of claim 1 wherein the vertically disposed transmitting coils are of generally rectangular configuration.

3. The system of claim 2 wherein the horizontally disposed transmitting coils are of generally square configuration.

4. The system of claim 2 wherein the central plane of each of the crossed pairs of rectangularly configured vertical coils is aligned to bisect the corners of the horizontal transmitting coils.

5. The system of claim 2 wherein the receiving coils are of a diameter sufficient to span the distance between the vertically disposed pair of transmitting coils with which the receiving coils are associated.

6. The system of claim 2 wherein the receiving coils are of a diameter sufficient to extend beyond the edge of the vertically disposed pair of transmitting coils with which the receiving coils are associated.

7. The system of claim 2 wherein the receiving coils are positioned so as to be laterally centered relative to the paired transmitting coils with which the receiving coils are associated.

8. The system of claim 1 wherein each of the transmitting coils is electrostatically isolated one from the other.

9. The system of claim 1 wherein each of the receiving coils is electrostatically isolated one from the other and electrostatically isolated from each of the transmitting coils.

10. The system of claim 3 wherein the height of the vertical transmitting coils is of the same dimension as a side of the horizontal coils.

11. A method for the detection of buried metallic objects employing the detection system of claim 1, comprising the steps of
   a) positioning the detection system in proximity to an area to be interrogated;
   b) powering in at least one cycle each of the three pairs of transmitter coils in sequence for a finite on-time period;
   c) during the transmitter coil off-time detecting the output from each of the paired sets of receiving coils, said paired sets connected in such manner that their summed output equals zero during transmitter coil on-time; and
   d) thereafter determining the nature of a detected buried metallic object based on the readings resulting from said at least one cycle of transmitter coil on-time sequences.

12. The method of claim 11 wherein the powering step (b) is repeated for more than one cycle, and readings taken from each of the paired sets of receiving coils for each of said on-time cycles of said transmitter coils.

* * * * *